No. 788,870. PATENTED MAY 2, 1905.
W. S. WHITNEY.
DUMPING ASH PAN.
APPLICATION FILED OCT. 22, 1904.

Witnesses: Inventor
By his Attorney William S. Whitney.
Edward N. Pagelsen.

No. 788,870. Patented May 2, 1905.

UNITED STATES PATENT OFFICE.

WILLIAM S. WHITNEY, OF FORT SMITH, ARKANSAS.

DUMPING ASH-PAN.

SPECIFICATION forming part of Letters Patent No. 788,870, dated May 2, 1905.

Application filed October 22, 1904. Serial No. 229,536.

*To all whom it may concern:*

Be it known that I, WILLIAM S. WHITNEY, a citizen of the United States, and a resident of Fort Smith, in the county of Sebastian and State of Arkansas, have invented a new and Improved Dumping Ash-Pan, of which the following is a specification.

My invention relates to ash-pans for locomotive-furnaces; and the objects of my improvement are to provide an ash-pan having a bottom composed of narrow leaves so pivoted that each may swing downward, to provide means whereby said leaves are rigidly held in horizontal position, and to provide locking means for said leaves. I attain these objects by the construction illustrated in the accompanying drawings, in which—

Figures 1, 2:
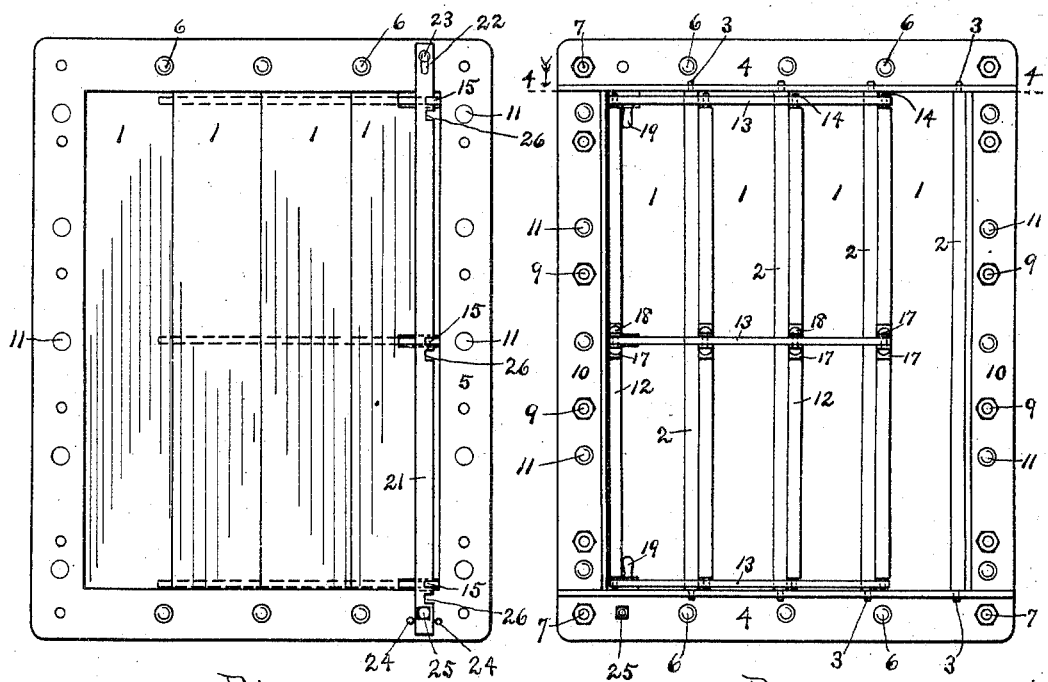
Figure 3:
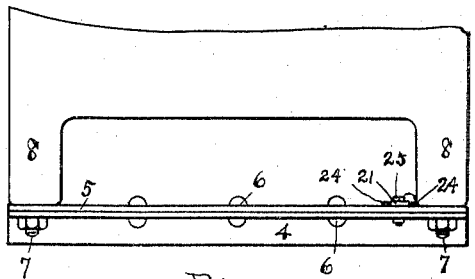
Figure 4:
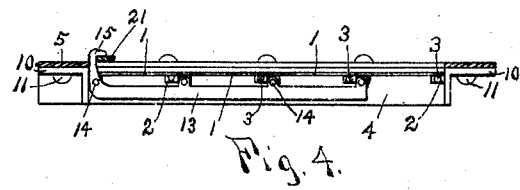
Figure 5:
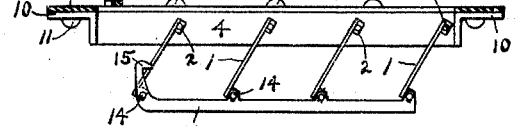
Figure 6:

Figure 1 is a plan of my ash-pan. Fig. 2 is a bottom view of the same. Fig. 3 is a rear view of the same secured to the water-legs of a boiler-furnace. Fig. 4 is a cross-section on the line 4 4 of Fig. 2. Fig. 5 is a similar view showing the leaves released and in discharging position. Fig. 6 is a view of one of the handles secured to the connecting-bars.

Similar reference characters indicate like parts throughout the several views.

In my improved construction the bottom of the pan is built up of leaves 1, which are each provided with a stiffening-bar 2 along one edge. These bars have pivot-pins or trunnions 3 formed on their ends, which pivots are journaled in holes in the end plates 4, which are secured to the base-plate 5 of the frame by the rivets 6 and also by the stud-bolts 7, which serve to secure the frame to the bottom of the water-legs 8 of the boiler. Other stud-bolts 9 also serve to secure the frame to the water-legs. Side plates 10 are secured to the base-plate 5 of the frame by rivets 11, which have countersunk heads on the upper side of the base-plate. I have shown these leaves to be four in number; but a greater or less number may be used, if desired. The depth of the ash-pan may be increased or decreased, as desired, by using angle-irons of greater or less depth for the side and end plates.

Secured to the outer edge of each leaf 1 is a second bar 12, shorter than the bar 2, which has its ends rounded into pins 14. Connecting-bars 13 are provided with holes into which the pins 14 fit loosely. Each of these bars is provided at one end with a hook 15, which normally extend up beyond the surface of the base-plate 5, where they may engage the upper surface of the slidable bar 21.

Angle-brackets 17 are secured to the middle of each bar 12 and carry bolts 18, which form the connection between the leaves 1 and the middle connecting-bar 13. The two outer connecting-bars are provided with handles 19 for the purpose to be explained later.

Resting on the base-plate 5 is the slidable bar 21, which is provided at one end with a slot 22, in which fits the bolt 23, which bolt guides and limits the movement of the bar. The other end of the bar is guided by two studs or pins 24, one on each side of the bar. A bolt 25 passes through the slidable bar and the frame, thus locking the bar in normal position. Notches 26 are cut into the edge of this bar of a depth sufficient to permit the hooks 15 of the connecting-bars to pass freely downward.

The method of dumping this ash-pan is as follows: When the locomotive is over the pit, one of the cleaners removes the bolt 25 and slides the bar away from him. This carries the notches 26 under the hooks 15, and as there is then nothing to support the outer ends of the leaves 1 they drop to the position shown in Fig. 5, dumping anything that may rest upon them. It will be noticed that the ashes will fall directly under the ash-pan and not beyond the ends on the legs and feet of the cleaners. Each man then reaches up and grasps a handle 19 and pushes it upward until the parts assume the position shown in Fig. 4, when with his free hand one of them slides the bar 21 back to the position shown in Fig. 1. The bolt 25 is then inserted and the nut screwed on. The whole process occupies less than a minute, thus saving much time over the usual method.

Having thus explained my improvement, what I claim as my invention, and desire to secure by Letters Patent, is—

In an ash-pan, the combination of a frame, leaves pivoted at one edge in said frame, bars connected to the other edges of said leaves and adapted to swing the same to horizontal position, each of said bars having a hook at one end of the same, handles on said bars to swing the same, a notched slidable bar adapted to engage said hooks to hold said leaves horizontal and to be moved until said notches are under said hooks thereby permitting said leaves to swing downward, a bolt projecting from said frame to guide one end of said bar, and means to lock the opposite end of said bar.

In testimony whereof I have signed my name to this specification in the presence of two subscribing witnesses.

WILLIAM S. WHITNEY.

Witnesses:
J. HERMAN HINES,
LAMAR G. HUMPHRY.